United States Patent
Saeki et al.

(10) Patent No.: US 9,792,464 B2
(45) Date of Patent: Oct. 17, 2017

(54) CARD PROCESSING SYSTEM

(71) Applicant: NIDEC SANKYO CORPORATION, Suwa-gun, Nagano (JP)

(72) Inventors: Kazuto Saeki, Nagano (JP); Toshiro Shiomi, Nagano (JP)

(73) Assignee: NIDEC SANKYO CORPORATION, Suwa-Gun, Nagano (JP)

( * ) Notice: Subject to any disclaimer, the term of this patent is extended or adjusted under 35 U.S.C. 154(b) by 0 days.

(21) Appl. No.: 15/123,815

(22) PCT Filed: Mar. 5, 2015

(86) PCT No.: PCT/JP2015/056481
§ 371 (c)(1),
(2) Date: Sep. 6, 2016

(87) PCT Pub. No.: WO2015/133566
PCT Pub. Date: Sep. 11, 2015

(65) Prior Publication Data
US 2017/0017812 A1    Jan. 19, 2017

(30) Foreign Application Priority Data

Mar. 7, 2014  (JP) ................................. 2014-044745

(51) Int. Cl.
*G06K 7/08* (2006.01)
*G06K 7/00* (2006.01)

(52) U.S. Cl.
CPC ......... *G06K 7/0069* (2013.01); *G06K 7/0056* (2013.01); *G06K 7/087* (2013.01)

(58) Field of Classification Search
CPC ........... G06K 7/084; G06K 7/12; G06K 7/127
(Continued)

(56) References Cited

U.S. PATENT DOCUMENTS

2010/0170949 A1* 7/2010 Ishikawa ............ G06K 13/0875
                                                    235/439
2011/0006118 A1*  1/2011 Mizawa ............. G06K 13/0875
                                                    235/483
(Continued)

FOREIGN PATENT DOCUMENTS

JP    H03171277 A    7/1991
JP    2001202480 A   7/2001
(Continued)

OTHER PUBLICATIONS

International Search Report corresponding to Application No. PCT/JP2015/056481; Date of Mailing: May 19, 2015, with English translation.

*Primary Examiner* — Daniel St Cyr
(74) *Attorney, Agent, or Firm* — Cantor Colburn LLP (57) ABSTRACT

A card processing system may include a card reader read data recorded in the card or record data to the card; and a host control section to control the card processing system. The card reader may include a card insertion part include an insertion port and a control section. The card insertion part may include a light emitting part. The control section may be connected with the host control section and be configured to perform light emission control which controls an emission color and an emitting method. The host control section may be configured to specify a host-side combination of an emission color and an emitting method and be configured to perform the light emission control. The host control section may previously set a predetermined combination of an emission color and an emitting method based on the host side combination of the emission color and the emitting method.

8 Claims, 4 Drawing Sheets

(58) Field of Classification Search
USPC .............................. 235/449, 492, 493, 380
See application file for complete search history.

(56) References Cited

U.S. PATENT DOCUMENTS

| | | | | |
|---|---|---|---|---|
| 2011/0162941 A1* | 7/2011 | Mizawa | ............... | G06K 13/085 |
| | | | | 198/617 |
| 2012/0307499 A1* | 12/2012 | Watanabe | ............... | G06K 13/08 |
| | | | | 362/253 |
| 2014/0008438 A1* | 1/2014 | Kitazawa | ............... | G06K 13/08 |
| | | | | 235/449 |

FOREIGN PATENT DOCUMENTS

| | | | |
|---|---|---|---|
| JP | 2004185513 | A | 7/2004 |
| JP | 2007108980 | A | 4/2007 |
| JP | 2009245108 | A | 10/2009 |
| JP | 2010160666 | A | 7/2010 |

\* cited by examiner

CARD PROCESSING SYSTEM

CROSS REFERENCE TO RELATED APPLICATIONS

This is the U.S. national stage of application No. PCT/JP2015/056481, filed on Mar. 5, 2015. Priority under 35 U.S.C. §119(a) and 35 U.S.C. §365(b) is claimed from Japanese Application No. 2014-044745, filed Mar. 7, 2014, the disclosure of which is incorporated herein by reference.

TECHNICAL FIELD

At least an embodiment of the present invention relates to a card processing system on which a card reader is mounted.

BACKGROUND

Conventionally, a card reader has been known in which a card inserted into a gate port is taken into its inside by a card conveying mechanism to perform a predetermined processing (see, for example, Patent Literature 1). In the card reader described in Patent Literature 1, a card insertion guide body for guiding a card to an inside of the card reader is attached to the gate port. A card insertion guide body includes a case formed of light transmitting material and a light source accommodated in the case. In the card reader, since the gate port into which a card is to be inserted is illuminated, visibility of the gate port can be enhanced.

Conventionally, as a card reader whose gate port is illuminated like the card reader described in Patent Literature 1, a card reader has been utilized which includes a detection mechanism structured to detect that a normal card has been inserted into the gate port in a correct posture. In the card reader, when a non-normal card is inserted or, when a normal card is inserted in a wrong posture, the light source is illuminated in a different emission color and a different emitting method from an emission color and an emitting method when a normal card has been inserted in a correct posture. For example, when a normal card has been inserted in a correct posture, the light source is lighted in blue and, when a non-normal card has been inserted or, when a normal card has been inserted in a wrong posture, the light source is blinked in red. As described above, in the card reader, when a non-normal card has been inserted or, when a normal card has been inserted in a wrong posture, an emission color and an emitting method of a light source are changed to guide a user to insert a normal card in a correct posture.

In this type of a card reader, an emission color and an emitting method of a light source are commonly controlled on the basis of a predetermined program in a firmware stored in a control section of the card reader.

PATENT LITERATURE

[PTL 1] Japanese Patent Laid-Open No. 2004-185513

In recent years, a light source which is capable of emitting a light in a multi-color and multi-gradation may be used in a card reader whose gate port is illuminated like the card reader described in Patent Literature 1. However, in the conventional card reader, an emission color and an emitting method of a light source are controlled on the basis of a program in a firmware stored in a control section of the card reader. Therefore, even when a light source capable of emitting a light in a multi-color and multi-gradation is used in a card reader, an emission color and an emitting method of a light source are fixed for each of the card readers. In other words, in the conventional card reader, it is difficult that a light source is lighted in various emission colors and emitting methods according to needs of respective customers such as a bank where the card reader is installed.

On the other hand, if a program in a firmware is prepared for each of customers so that a light source is lighted in an emission color and an emitting method according to a need of a customer, the light source can be lighted in various emission colors and emitting methods so as to meet the needs for respective customers. However, in this case, a firmware is required to be prepared for each of customers and thus a design of the firmware becomes complicated and manufacture management and inventory management of card readers also become complicated.

SUMMARY

In view of the problem described above, at least an embodiment of the present invention provides a card processing system in which a light emitting part of a card reader is capable of being lighted in various emission colors and emitting methods according to a need of a customer even when the firmware stored in a control section of the card reader is common.

To achieve the above, at least an embodiment of the present invention provides a card processing system on which a card reader structured to perform at least one of reading of data recorded in a card and recording of data to the card is mounted, and the card processing system includes a host control section for controlling the card processing system. The card reader includes a card insertion part which is formed with an insertion port into which the card is inserted and a control section for controlling the card reader, and the card insertion part includes a light emitting part which is capable of emitting light in plurality of colors. The control section is connected with the host control section and performs light emission control which controls an emission color and an emitting method of the light emitting part. The host control section is stored with a host side light emission program which specifies a combination of an emission color and an emitting method of the light emitting part and is configured to perform light emission control, and the host control section previously sets a light emission program based on the host side light emission program in the control section, and the control section performs the light emission control based on the previously set light emission program.

In the card processing system in accordance with at least an embodiment of the present invention, the host control section previously sets a light emission program in the control section of the card reader based on the host side light emission program stored in the host control section, and the control section performs the light emission control based on the previously set light emission program. Therefore, according to at least an embodiment of the present invention, even when the firmware stored in the control section of the card reader is common, the control section is capable of making the light emitting part of the card reader be lighted in various emission colors and emitting methods based on the light emission program previously set by the host control section. In other words, in at least an embodiment of the present invention, even when the firmware stored in the control section of the card reader is common, the light emitting part is capable of being lighted in various emission colors and emitting methods according to needs of customers such as a bank in which the card processing system is installed.

For example, even if the firmware stored in the control section of the card reader is common, the light emitting part of the card reader is lighted in various emission colors and emitting methods each time by communicating between the host control section and the control section, and thus the light emitting part is capable of being lighted in various emission colors and emitting methods according to needs of customers. However, in this case, a time before the light emitting part is lighted becomes longer. In other words, in this case, responsibility of the light emitting part is lowered. However, according to at least an embodiment of the present invention, the control section performs light emission control based on the light emission program previously set in the control section and thus responsibility of the light emitting part is capable of being enhanced.

In at least an embodiment of the present invention, for example, the card insertion part includes a card insertion detection mechanism structured to detect that a normal card is inserted into the insertion port in a correct posture. When an insertion of a non-normal card into the insertion port and an insertion of the normal card into the insertion port in a wrong posture is referred to as a non-appropriate insertion of the card, when the host side light emission program configured to perform the light emission control in a case that the non-appropriate insertion of the card has been detected based on a detected result by the card insertion detection mechanism is referred to as a host side abnormality light emission program and, when the light emission program which is previously set in the control section based on the host side abnormality light emission program is referred to as an abnormality light emission program, the host control section is stored with the host side abnormality light emission program, the host control section previously sets the abnormality light emission program based on the host side abnormality light emission program in the control section and, when the non-appropriate insertion of the card has been detected based on the detected result of the card insertion detection mechanism, the control section performs the light emission control based on the previously set abnormality light emission program.

In this case, even when the firmware stored in the control section of the card reader is common, the light emitting part is capable of being lighted in various emission colors and emitting methods according to needs of customers when a non-appropriate insertion of the card is detected. Further, in a case that the abnormality light emission program is not previously set in the control section and the host control section performs light emission control of the light emitting part when a non-appropriate insertion of a card is detected, a delay time becomes long and light emission control of the light emitting part based on the abnormality light emission program cannot be started immediately. However, in at least an embodiment of the present invention, the abnormality light emission program is previously set in the control section and, when a non-appropriate insertion of a card has been detected based on a detected result of the card insertion detection mechanism, the control section performs light emission control based on the abnormality light emission program and thus light emission control based on the abnormality light emission program can be started immediately. Therefore, light emission control can be performed synchronously with a card operation of a user who inserts a card into the card reader.

In at least an embodiment of the present invention, it is preferable that, when the light emission program configured to perform the light emission control just before that the non-appropriate insertion of the card is detected based on the detected result of the card insertion detection mechanism is referred to as a normal light emission program, the control section stores the normal light emission program when the non-appropriate insertion of the card has been detected based on the detected result of the card insertion detection mechanism, and after that, the control section performs the light emission control based on the previously set abnormality light emission program and, when the non-normal card or the normal card inserted in a wrong posture is taken out and the non-appropriate insertion of the card is not detected, the control section reads out the normal light emission program having been stored and performs the light emission control based on the normal light emission program. According to this structure, after the non-normal card or the normal card inserted in a wrong posture is taken out, light emission control based on the normal light emission program is capable of being started immediately. Therefore, light emission control can be performed synchronously with a card operation of a user who inserts a card into the card reader.

In at least an embodiment of the present invention, the card insertion detection mechanism includes, for example, a thickness detection mechanism structured to detect a thickness of the card and a width detection mechanism structured to detect a width of the card in a direction perpendicular to an inserting direction of the card.

In at least an embodiment of the present invention, for example, the card is formed in a substantially rectangular shape, and the card reader performs at least one of reading of data and recording of data to the card which is inserted so that a short-side direction of the card is an inserting direction of the card. In this case, a card can be inserted into the insertion port so that a longitudinal direction of the card is an inserting direction of the card and thus a possibility that a card is inserted into the insertion port in a wrong posture becomes higher. However, even if a card is inserted into the insertion port in a wrong posture, an insertion of the card in a wrong posture can be notified to a user of the card reader by making the light emitting part being lighted.

As described above, in the card processing system of at least an embodiment of the present invention, even when the firmware stored in the control section of the card reader is common, the light emitting part is capable of being lighted in various emission colors and emitting methods according to needs of customers.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

At least an embodiment of the present invention will be described below with reference to the accompanying drawings.

(Schematic Structure of Card Processing System)

Figure 1:
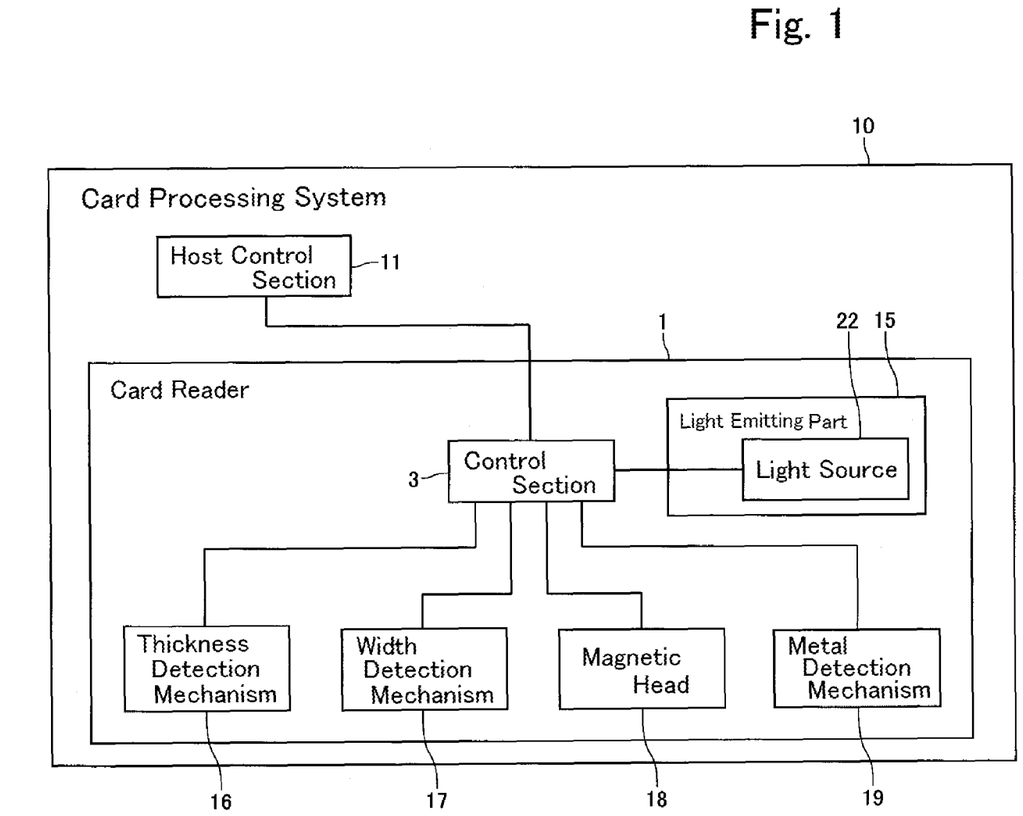
FIG. 1 is an explanatory block diagram showing a schematic structure of a card processing system in accordance with an embodiment of the present invention.
Figure 2:
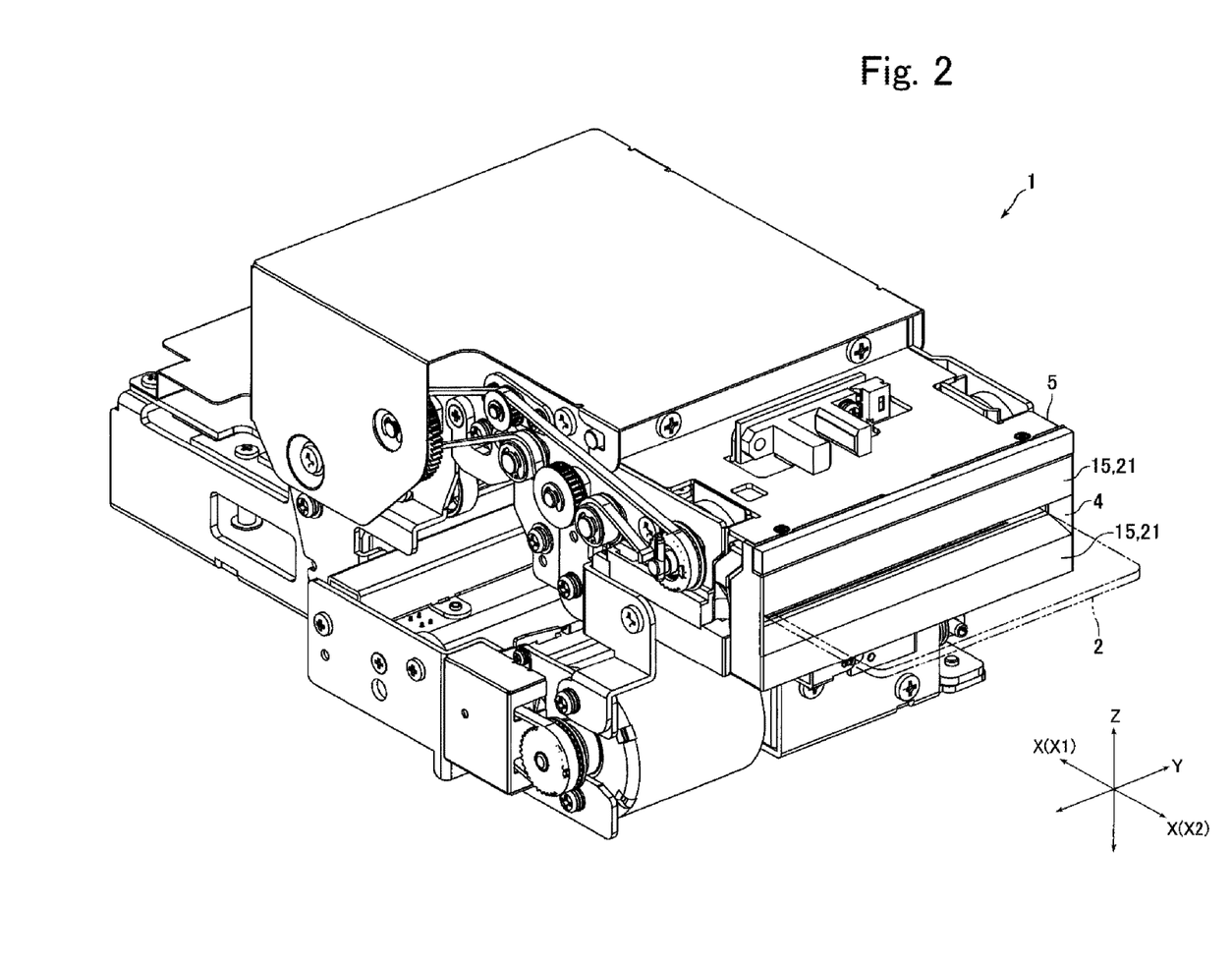
FIG. 2 is a perspective view showing a card reader structuring a card processing system shown in FIG. 1.
Figure 3:
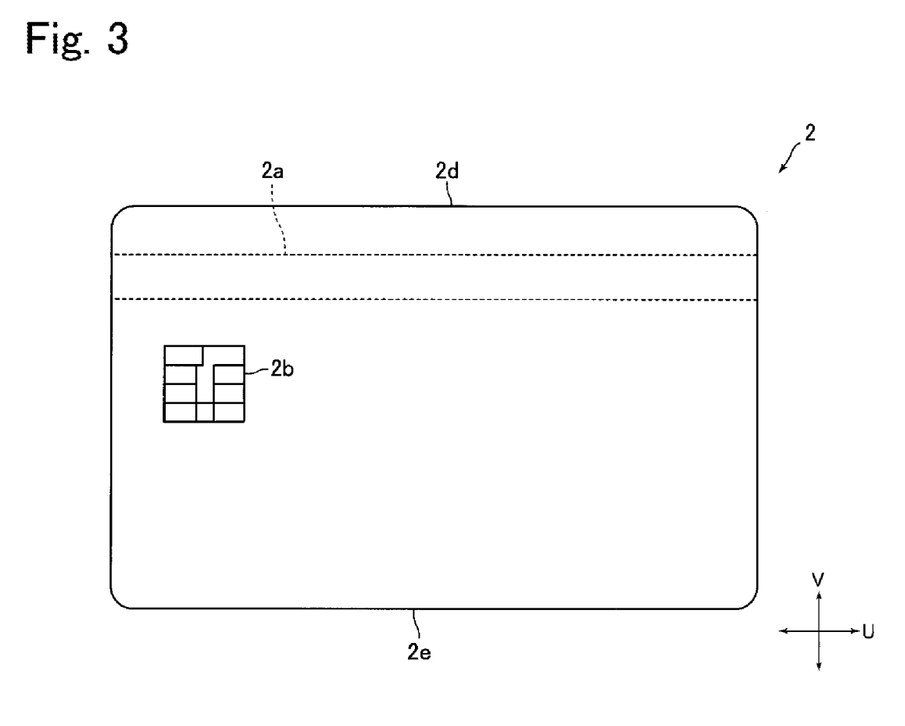
FIG. 3 is a plan view showing a card in FIG. 2.

FIG. 1 is an explanatory block diagram showing a schematic structure of a card processing system 10 in accordance with an embodiment of the present invention. FIG. 2 is a perspective view showing a card reader 1 structuring a card processing system 10 shown in FIG. 1. FIG. 3 is a plan view showing a card 2 in FIG. 2.

A card processing system 10 in this embodiment is a system on which a card reader 1 structured to perform at least one of reading of data recorded in a card 2 and recording of data to a card 2 is mounted. For example, the card processing system 10 is an ATM (Automated Teller Machine) which is installed and used in a bank or the like. The card processing system 10 includes a host control section 11 structured to control the card processing system 10 in addition to the card reader 1.

A card reader 1 includes a control section 3 structured to control the card reader 1. The control section 3 is connected with the host control section 11. Further, the card reader 1 includes a card insertion part 5 which is formed with an insertion port 4 into which a card 2 is inserted. A card conveying passage where a card 2 is conveyed is formed in an inside of the card reader 1 so as to be connected with the insertion port 4. In addition, the card reader 1 includes a card conveying mechanism structured to convey a card 2, a magnetic head configured to abut with a card 2 and perform reading of magnetic data recorded in the card 2 and/or recording magnetic data to the card 2, a head moving mechanism structured to move the magnetic head in a direction perpendicular to a conveying direction of the card 2, an IC contact block configured to contact with a terminal part 2b described below which is formed on the card 2 and perform data communication, and a contact block moving mechanism structured to move the IC contact block.

A card 2 is a card made of vinyl chloride whose thickness is about 0.7-0.8 mm. A card 2 in this embodiment is a card with a magnetic stripe in conformity with the international standard (for example, ISO/IEC7811) or JIS standard (for example, JISX6302) and is formed in a substantially rectangular shape whose four corners are rounded. A rear face of a card 2 is formed with a magnetic stripe 2a where magnetic data are recorded. Further, the card 2 is a contact type IC card. In other words, an IC chip (not shown) is incorporated into the card 2, and a front face of the card 2 is formed with a terminal part 2b comprised of eight external connection terminals. In accordance with an embodiment of the present invention, no magnetic stripe 2a may be formed on a card 2. Further, no IC chip (not shown) may be incorporated into a card 2. In other words, no terminal part 2b may be formed on a card 2.

A magnetic stripe 2a is formed in a long and thin strip shape which is parallel to a longitudinal direction ("U"-direction in FIG. 3) of a card 2 formed in a substantially rectangular shape. The magnetic stripe 2a is formed over the entire region in the longitudinal direction of a card 2. Further, in a short-side direction ("V"-direction in FIG. 3) of the card 2, the magnetic stripe 2a is formed on one end 2d side in the short-side direction of the card 2. Specifically, the magnetic stripe 2a is formed within a predetermined range in the short-side direction of the card 2 with the one end 2d of the card 2 as a reference based on the international standard or JIS standard.

The terminal part 2b is formed on one end side in the longitudinal direction of a card 2 and at substantially a middle position in the short-side direction of the card 2. Eight external connection terminals which structure the terminal part 2b are arranged in four lines in the short-side direction of a card 2 and two rows in the longitudinal direction of the card 2.

In this embodiment, a card 2 is conveyed in the "X" direction shown in FIG. 2. Specifically, a card 2 is inserted in the "X1" direction and taken into an inside, and the card 2 is ejected in the "X2" direction. In other words, the "X" direction is a conveying direction of a card 2, the "X1" direction is an inserting direction of the card 2 and the "X2" direction is an ejecting direction of the card 2. Further, in this embodiment, a card 2 is taken into the card reader 1 so that the short-side direction of a card 2 and the "X" direction are coincided with each other. Further, the card 2 is conveyed in an inside of the card reader 1 so that the short-side direction of the card 2 and the "X" direction are coincided with each other. In other words, the card reader 1 performs reading and/or recording of data for a card 2 inserted so that the short-side direction of the card 2 is an inserting direction of the card 2.

The "Y" direction perpendicular to the "X" direction is a width direction of a card conveying passage and is a longitudinal direction of a card 2 taken into an inside of the card reader 1 in a correct posture. Further, the "Z" direction perpendicular to the "X" direction and the "Y" direction is a height direction of the card conveying passage and is a thickness direction of a card 2 taken into the inside of the card reader 1. In this embodiment, the card reader 1 is disposed so that the "Z" direction and a vertical direction are coincided with each other. In the following descriptions, the "X" direction is referred to as a "front and rear direction", the "Y" direction is referred to as a "right and left direction", and the "Z" direction is an "upper and lower direction". In this embodiment, a magnetic head is disposed to a lower side of the card conveying passage and is abutted with a magnetic stripe 2a from a lower side of a card 2. Further, an IC contact block is disposed to an upper side of the card conveying passage and is structured to contact with a terminal part 2b from an upper side of a card 2.

(Structure of Card Insertion Part)

A card insertion part 5 structures a front face side portion of the card reader 1. The card insertion part 5 includes a light emitting part 15 that is capable of being lighted or emitting light in a plurality of colors. Further, the card insertion part 5 includes a thickness detection mechanism 16 structured to detect a thickness of a card 2 inserted into the insertion port 4, a width detection mechanism 17 structured to detect a width in the right and left direction of the card 2, a magnetic head (pre-head) 18 configured to detect a magnetic stripe 2a formed on the card 2, and a metal detection mechanism 19 structured to detect external connection terminals of an IC chip fixed on the card 2 (in other words, the terminal part 2b fixed on the card 2) (see FIG. 1).

The light emitting part 15 is, as shown in FIG. 2, disposed on both sides in the upper and lower direction of the insertion port 4. Further, the light emitting part 15 structures a part of a front face of the card reader 1. In other words, the light emitting part 15 is disposed in the vicinity of the insertion port 4. The light emitting part 15 includes a case body 21 formed of light transmitting material, a light source 22 (see FIG. 1) accommodated in an inside of the case body 21, and a light guide plate (not shown) which is accommodated in the inside of the case body 21 for diffusing light of the light source 22. In this embodiment, the light emitting part 15 is capable of emitting light in various light emissions such as in multi-colors and multi-gradations and lighting or blinking depending on a light emission program described below.

The light source 22 is an LED light source and is mounted on a circuit board not shown. This light source 22 is connected with the control section 3. The control section 3 performs a light emission control for controlling an emitting method of the light source 22 such as lighting or blinking and controlling an emission color of the light source 22. Specifically, a plurality of pairs of three colors of LED light sources, i.e., a red LED light source, a green LED light source and a blue LED light source is disposed in the light emitting part 15 as the light source 22. The control section 3 varies a color tone by changing a combination of lighting of the three colors of the LED light sources. Further, in this embodiment, the light source 22 is disposed on a right end side and/or a left end side of the inside of the case body 21 and the light guide plate is disposed over substantially an entire region in the right and left direction of the inside of the case body 21. Therefore, when the light source 22 emits light, the entire light emitting part 15 in the right and left direction is illuminated. In accordance with an embodiment of the present invention, a plurality of the light sources 22 may be disposed with a predetermined interval over substantially the entire region of the case body 21 in the right and left direction. In this case, no light guide plate may be provided. Further, the light source 22 may be a light source other than an LED light source.

The thickness detection mechanism 16 includes, for example, a movable member which is movable between a closing position where the movable member is disposed in the card conveying passage to close the card conveying passage and an open position where the movable member is retreated to a lower side of the card conveying passage when a card 2 passing the card conveying passage is contacted to open the card conveying passage, an urging member which urges the movable member toward the closing position, and a sensor configured to detect movement of the movable member. In the thickness detection mechanism 16, when a card 2 having a normal thickness is inserted into the insertion port 4, movement of the movable member is detected by the sensor. However, even when a card 2 having a thickness thinner than a normal thickness is inserted into the insertion port 4, movement of the movable member is not detected by the sensor. Therefore, based on a detected result of the sensor, it is capable of detecting whether a card 2 having a normal thickness has been inserted into the insertion port 4 or not.

The width detection mechanism 17 includes, for example, two detection levers which are disposed on both right and left end sides of the card insertion part 5 and capable of protruding to and retreating from the card conveying passage, and two sensors configured to detect respective movements of two detection levers. In a standby state before a card 2 is inserted into the card reader 1, a part of the detection lever is disposed in an inside of the card conveying passage. In this state, when a card 2 is inserted into the insertion port 4 so that a short-side direction of the card 2 is coincided with the front and rear direction, each of both right and left ends of the card 2 is contacted with each of the two detection levers and the detection levers are turned and thus turning of each of the detection levers is detected by the sensor. On the other hand, even when a card 2 is inserted into the insertion port 4 so that a longitudinal direction of the card 2 is coincided with the front and rear direction or, even when a card 2 whose width in its short-side direction is narrower than a normal width is inserted into the insertion port 4, turning of at least one detection lever is not detected by the sensor. Therefore, based on detected results by the two sensors, it can be detected whether a card 2 whose width in its short-side direction is a normal width has been inserted into the insertion port 4 so that its short-side direction and the front and rear direction are coincided with each other or not. In other words, based on detected results by the two sensors, it can be detected whether a card 2 whose width in its short-side direction is a normal width has been inserted into the insertion port 4 in a correct posture or not.

In this embodiment, the thickness detection mechanism 16 and the width detection mechanism 17 structure a card insertion detection mechanism for detecting a normal card 2 having been inserted into the insertion port 4 in a correct posture.

An output signal of the magnetic head 18 is varied when a card 2 formed with a magnetic stripe 2*a* is inserted into the insertion port 4 and the card 2 is conveyed so that the magnetic stripe 2*a* is contacted with the magnetic head 18. Therefore, based on a detected result of the magnetic head 18, it can be detected whether a magnetic stripe 2*a* is formed on a card 2 or not.

The metal detection mechanism 19 is a magnetic type sensor which includes an excitation coil, a detection coil and a core around which the excitation coil and the detection coil are wound. The metal detection mechanism 19 is disposed at a position in the right and left direction where a terminal part 2*b* of a card 2 inserted in a correct posture is passed. An output signal of the metal detection mechanism 19 is varied when a card 2 formed with a terminal part 2*b* is inserted into the insertion port 4. Therefore, based on a detected result of the metal detection mechanism 19, it can be detected whether a terminal part 2*b* is formed on a card 2 or not.

( Light Emission Control of Light Emitting Part)

Figure 4:
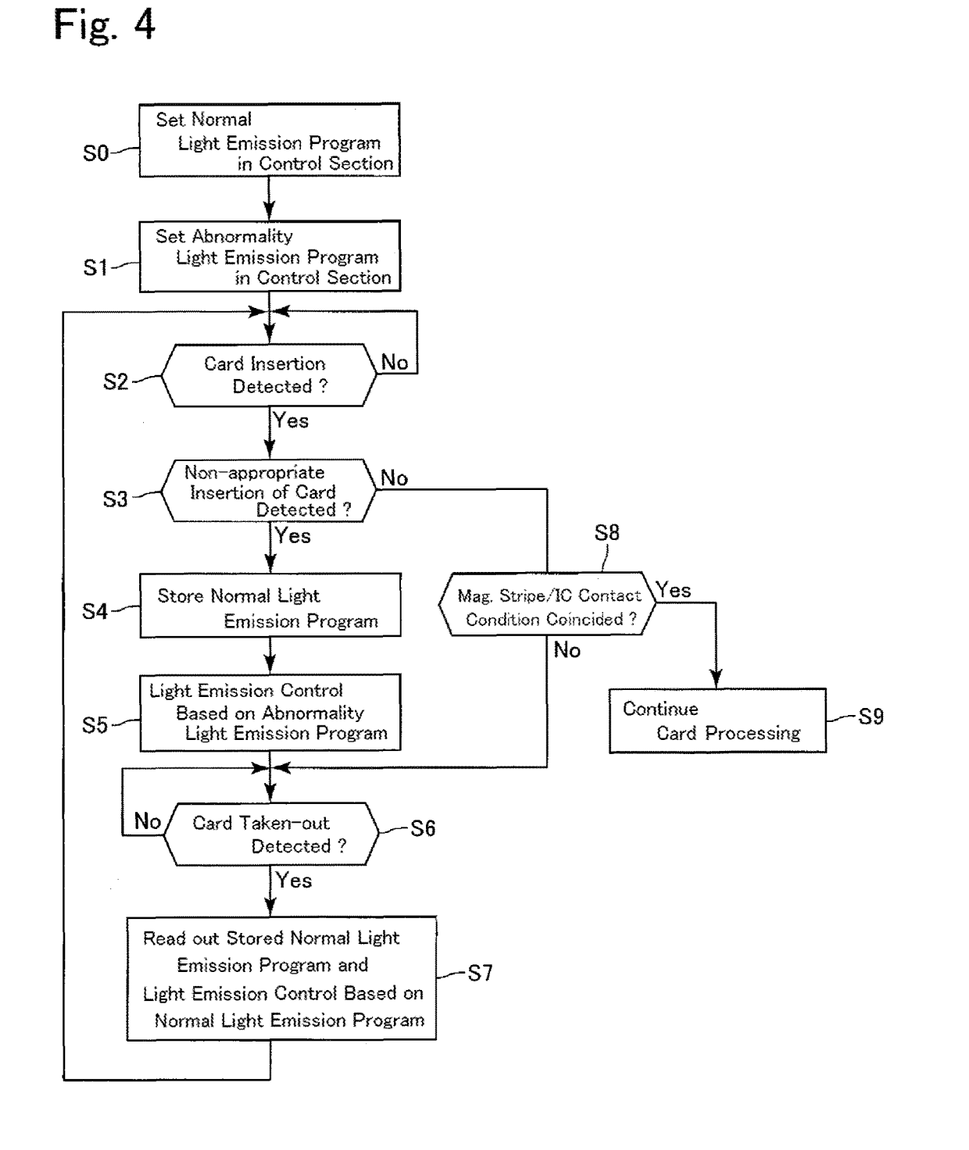
FIG. 4 is an explanatory flow chart showing one example of light emission control of a light emitting part shown in FIG. 1.

FIG. 4 is an explanatory flow chart showing one example of light emission control of the light emitting part 15 shown in FIG. 1.

In the card processing system 10, a host control section 11 is stored with a host side light emission program which specifies a combination of an emission color and an emitting method of the light emitting part 15 and is configured to perform light emission control of the light emitting part 15 by the control section 3. When a case that a non-normal card 2 is inserted into the insertion port 4 and a case that a normal card 2 is inserted into the insertion port 4 in a wrong posture are referred to as a "non-appropriate insertion of a card 2" and, when a host side light emission program for performing light emission control of the light emitting part 15 at the time when a non-appropriate insertion of a card 2 has been detected based on detected results of the thickness detection mechanism 16 and the width detection mechanism 17 is referred to as a "host side abnormality light emission program", in this embodiment, the host side abnormality light emission program is stored in the host control section 11. Further, when a host side light emission program for performing light emission control of the light emitting part 15 at the time when a non-appropriate insertion of a card 2 is not detected is referred to as a "host side normal light emission program", the host side normal light emission program is stored in the host control section 11. On the other hand, a program for performing light emission control of the light emitting part 15 is not set in the control section 3 in an initial state.

The host control section 11 sets an abnormality light emission program based on the host side abnormality light emission program in the control section 3 through a setting command at a predetermined timing before processing of a card 2 is started (step "S1"). In other words, the host control section 11 sets an abnormality light emission program in the control section 3 in advance. In this state, when an insertion of a card 2 is detected by the thickness detection mechanism 16 and/or the width detection mechanism 17 ("Yes" in step "S2"), the control section 3 judges whether a normal card 2 has been inserted into the insertion port 4 in a correct posture or not based on detected results of the thickness detection mechanism 16 and the width detection mechanism 17 (step "S3"). In other words, the control section 3 judges whether a non-appropriate insertion of a card 2 has been detected or not based on detected results of the thickness detection mechanism 16 and the width detection mechanism 17.

In this embodiment, the host control section 11 sets a normal light emission program based on the host side normal light emission program in the control section 3 through a setting command at a predetermined timing before the step "S1" (step "S0"). In a standby state before an insertion of a card 2 is detected by the thickness detection mechanism 16 and the width detection mechanism 17, the control section 3 performs light emission control of the light emitting part 15 based on the normal light emission program. For example, in a standby state, the control section 3 sets the light emitting part 15 to be lighted continuously in blue color.

In a case that a non-appropriate insertion of a card 2 has been detected in the step "S3", the control section 3 stores the normal light emission program (step "S4"). In other words, in a case that a non-appropriate insertion of a card 2 has been detected in the step "S3", the control section 3 stores the normal light emission program just before a non-appropriate insertion of a card 2 is detected based on detected results of the thickness detection mechanism 16 and the width detection mechanism 17.

After that, the control section 3 performs light emission control of the light emitting part 15 based on the abnormality light emission program previously set in the step "S1" (step "S5"). In other words, when a non-appropriate insertion of a card 2 is detected based on detected results of the thickness detection mechanism 16 and the width detection mechanism 17, the control section 3 stores the normal light emission program and, after that, the control section 3 performs light emission control of the light emitting part 15 based on the previously set abnormality light emission program. For example, the control section 3 intermittently blinks the light emitting part 15 in a red color.

After that, a non-normal card 2 or a normal card 2 inserted in a wrong posture is taken out from the insertion port 4 and the non-appropriate insertion of the card 2 is not detected (when "Yes" in step "S6"), the control section 3 reads out the normal light emission program stored in the step "S4" just before the non-appropriate insertion of the card 2 is detected, and the control section 3 performs light emission control of the light emitting part 15 based on the read-out normal light emission program (step "S7"). In other words, when it is detected that a non-normal card 2 or a normal card 2 inserted in a wrong posture has been taken out from the insertion port 4 based on detected results of the thickness detection mechanism 16 and the width detection mechanism 17, the control section 3 makes light emission control of the light emitting part 15 be returned from light emission control based on the abnormality light emission program to light emission control based on the normal light emission program stored in the step "S4" just before the non-appropriate insertion of the card 2 is detected. When the light emission control of the light emitting part 15 is returned to light emission control based on the normal light emission program, the flow is returned to the step "S2".

On the other hand, in the step "S3", when a normal card 2 has been inserted into the insertion port 4 in a correct posture, the control section 3 judges whether or not existence/absence of a magnetic stripe 2a and existence/absence of an IC contact point of the inserted card 2 are coincided with a condition of a card 2 to be processed in the card reader 1 based on detected results of the magnetic head 18 and the metal detection mechanism 19 (step "S8"). For example, in a case that a card 2 to be processed in the card reader 1 is a card 2 having a magnetic stripe 2a and an IC contact point, in the step "S8", the control section 3 judges whether an inserted card 2 is provided with a magnetic stripe 2a and an IC contact point or not based on detected results of the magnetic head 18 and the metal detection mechanism 19.

In the step "S8", when existence/absence of a magnetic stripe 2a and existence/absence of an IC contact point of the inserted card 2 are coincided with a condition of a card 2 to be processed in the card reader 1, the control section 3 continues processing of the card 2 in the card reader 1 (step "S9"). Specifically, in the step "S9", the card 2 is conveyed to an inside of the card reader 1 and reading and/or recording of data by a magnetic head and the IC contact block and the like are performed. In this embodiment, in the step "S9", the control section 3 performs light emission control of the light emitting part 15 based on the normal light emission program.

On the other hand, in the step "S8", when existence/absence of a magnetic stripe 2a and existence/absence of an IC contact point of an inserted card 2 are not coincided with a condition of a card 2 to be processed in the card reader 1, the flow is advanced to the step "S6" and the control section 3 judges whether a non-normal card 2 or a normal card 2 inserted in a wrong posture has been taken out from the insertion port 4 or not based on detected results of the thickness detection mechanism 16 and the width detection mechanism 17.

(Principal Effects in this Embodiment)

As described above, in this embodiment, the host control section 11 sets an abnormality light emission program based on a host side abnormality light emission program stored in the host control section 11 and a normal light emission program based on a host side normal light emission program stored in the host control section 11 in the control section 3 in advance, and the control section 3 performs light emission control of the light emitting part 15 based on the abnormality light emission program and the normal light emission program which are set in advance. Therefore, according to this embodiment, even when the firmware stored in the control section 3 is common, the control section 3 is capable of making the light emitting part 15 be lighted in various emission colors and emitting methods based on the abnormality light emission program and the normal light emission program previously set by the host control section 11. In other words, in this embodiment, even when the firmware stored in the control section 3 is common, the light emitting part 15 is capable of being lighted in various emission colors and emitting methods according to needs of customers such as a bank in which the card processing system 10 is installed.

In this embodiment, the abnormality light emission program is previously set in the control section 3 and, when a non-appropriate insertion of a card 2 is detected based on detected results of the thickness detection mechanism 16 and the width detection mechanism 17, light emission control of the light emitting part 15 is performed by the control section 3 based on the abnormality light emission program. Therefore, according to this embodiment, light emission control based on the abnormality light emission program can be started immediately. In other words, in a case that the abnormality light emission program is not previously set in the control section 3 and the host control section 11 performs light emission control of the light emitting part 15 when a non-appropriate insertion of a card 2 is detected, a delay time becomes long and light emission control of the light emitting part 15 based on the abnormality light emission program cannot be started immediately. However, in this embodiment, the control section 3 performs light emission control of the light emitting part 15 based on the abnormality light emission program and thus light emission control based on the abnormality light emission program can be started immediately. Therefore, according to this embodiment, light emission control of the light emitting part 15 can be performed synchronously with a card operation of a user who inserts a card 2 into the card reader 1.

In this embodiment, when a non-appropriate insertion of a card 2 is detected based on detected results of the thickness detection mechanism 16 and the width detection mechanism 17, the control section 3 stores a normal light emission program and, after that, the control section 3 performs light emission control of the light emitting part 15 based on a previously set abnormality light emission program and, when the non-normal card 2 or the normal card 2 inserted in a wrong posture has been taken out from the insertion port 4, the control section 3 reads out the normal light emission program stored just before the non-appropriate insertion of the card 2 is detected and performs light emission control of the light emitting part 15 based on the read-out normal light emission program. Therefore, according to this embodiment, after a non-normal card 2 or a normal card 2 inserted in a wrong posture is taken out from the insertion port 4, light emission control of the light emitting part 15 based on the normal light emission program is capable of being started immediately. Accordingly, light emission control of the light emitting part 15 is capable of being performed synchronously with a card operation of a user who inserts a card 2 into the card reader 1.

In this embodiment, for example, the light emitting part 15 is not required to be lighted and, alternatively, the light emitting part 15 may be continuously lighted in a green color in a standby state before an insertion of a card 2 is detected by the thickness detection mechanism 16 and/or the width detection mechanism 17. In this embodiment, in a case that a non-appropriate insertion of a card 2 has been detected, the control section 3 stores a state of light emission control (normal light emission program) of the light emitting part 15 just before the non-appropriate insertion of the card 2 is detected and, after that, the control section 3 performs light emission control of the light emitting part 15 based on the previously set abnormality light emission program. Therefore, even when the normal light emission program is different for each of customers, a state of light emission control just before a non-appropriate card 2 is detected is capable of being returned without setting complicated light emission program. In other words, the firmware can be used in common and light emission control of the light emitting part 15 of the card reader 1 coped with a need of a customer can be attained.

(Other Embodiments)

Although the present invention has been shown and described with reference to a specific embodiment, various changes and modifications will be apparent to those skilled in the art from the teachings herein.

In the embodiment described above, a host side abnormality light emission program is stored in the host control section 11 and, in the step "S1", the host control section 11 sets an abnormality light emission program based on the host side abnormality light emission program in the control section 3. However, the present invention is not limited to this embodiment. For example, a host side light emission program for performing light emission control of the light emitting part 15 in a predetermined situation except when a non-appropriate insertion of a card 2 has been detected is stored in the host control section 11 and, in the step "S1", the host control section 11 may set a light emission program based on the host side light emission program in the control section 3. For example, a host side light emission program for performing light emission control of the light emitting part 15 when another card 2 is inserted into the insertion port 4 in a state that a card 2 has been taken into an inside of the card reader 1 and a predetermined processing is being performed is stored in the host control section 11 and, in the step "S1", the host control section 11 may set a light emission program based on the host side light emission program in the control section 3. In this case, in a state that a card 2 has been taken into an inside of the card reader 1 and a predetermined processing is being performed, when another card 2 is inserted into the insertion port 4, the control section 3 performs light emission control of the light emitting part 15 based on the previously set light emission program.

In the embodiment described above, the host control section 11 sets a normal light emission program based on a host side normal light emission program in the control section 3 at a predetermined timing before the step "S1" through a setting command. However, the present invention is not limited to this embodiment. For example, a normal light emission program may be set in the firmware stored in the control section 3 in advance.

In the embodiment described above, in a case that the magnetic head 18 is disposed only to an under face side of a card conveying passage, it can be detected whether a card 2 has been inserted into the insertion port 4 in a state that its rear face faces a lower side, or a card 2 has been inserted into the insertion port 4 in a state that its front face faces a lower side. Further, in a case that the metal detection mechanism 19 is disposed on the left end side of the card conveying passage in FIG. 2, when a card 2 is inserted from one end 2*d* side in a short-side direction of the card 2 in a state that its rear face faces a lower side, the terminal part 2*b* of the card 2 is detected by the metal detection mechanism 19. Further, when a card 2 is inserted from the other end 2*e* side (see FIG. 3) in a short-side direction of the card 2 in a state that its front face faces a lower side, the terminal part 2*b* of the card 2 is detected by the metal detection mechanism 19. Therefore, based on a detected result of the magnetic head 18 and a detected result of the metal detection mechanism 19, it can be detected whether a card 2 has been inserted from one end 2*d* side of the card 2, or the card 2 has been inserted from the other end 2*e* side of the card 2.

Therefore, it may be detected whether a card 2 has been inserted into the insertion port 4 in a correct posture or not by detecting whether a card 2 has been inserted into the insertion port 4 so that a short-side direction of the card 2 is coincided with the front and rear direction by using the width detection mechanism 17 and, in addition, by detecting whether a card 2 has been inserted into the insertion port 4 in a state that its rear face faces a lower side or not, and by detecting whether the card 2 has been inserted from one end 2*d* side or not by using the magnetic head 18 and the metal detection mechanism 19. In this case, a card insertion detection mechanism for detecting that a normal card 2 has been inserted into the insertion port 4 in a correct posture is structured of the thickness detection mechanism 16, the width detection mechanism 17, the magnetic head 18 and the metal detection mechanism 19. Further, in this case, in the step "S3" in the flow chart shown in FIG. 4, when a normal card 2 is inserted into the insertion port 4 in a correct posture, the flow is advanced to the step "S9".

In the embodiment described above, the card 2 is a rectangular card made of vinyl chloride whose thickness is about 0.7-0.8 mm. However, the present invention is not limited to this embodiment. For example, the card 2 may be a PET (polyethylene terephthalate) card whose thickness is about 0.18-0.36 mm or may be a paper card having a predetermined thickness. Further, in the embodiment described above, the card reader 1 performs reading and/or recording of data to a card 2 inserted so that a short-side direction of a card 2 is an inserting direction of the card 2. However, the card reader 1 may perform reading and/or recording of data to a card 2 inserted so that a longitudinal direction of a card 2 is an inserting direction of the card 2.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A card processing system for use with a card, the card processing system comprising:
    a card reader structured to perform at least one of reading of data recorded in the card and recording of data to the card; and
    a host control section configured to control the card processing system,
    wherein the card reader comprises a card insertion part comprising an insertion port into which the card is inserted, and a control section configured to control the card reader,
    wherein the card insertion part comprises a light emitting part structured to emit light in plurality of colors,
    the card insertion part comprises a card insertion detection mechanism structured to detect whether the card is a normal card and is inserted into the insertion port in a correct posture,
    wherein the control section is connected with the host control section and is configured to perform light emission control which controls an emission color and an emitting method of the light emitting part,
    wherein the host control section is configured to specify a host-side combination of an emission color and an emitting method of the light emitting part and is configured to perform the light emission control,
    wherein the host control section previously sets a predetermined combination of an emission color and an emitting method based on the host side combination of the emission color and the emitting method,
    wherein the control section performs the light emission control based on the predetermined combination of the emission color and the emitting method, and
    the host control section is stored with a host side abnormality combination of the emission color and the emitting method, the host control section previously sets a predetermined abnormality combination of the emission color and the emitting method based on the host side abnormality combination of the emission color and the emitting method in the control section and, when a non-appropriate insertion of the card has been detected based on the detected result of the card insertion detection mechanism control section performs the light emission control based on the predetermined abnormality combination of the emission color and emitting method.

2. The card processing system according to claim 1, wherein
    the control section stores a normal light emission combination of the emission color and the emitting method when the non-appropriate insertion of the card has been detected based on the detected result of the card insertion detection mechanism, and after that, the control section performs the light emission control based on the predetermined abnormality combination of the emission color and the emitting method, and
    when the non-normal card or the normal card inserted in a wrong posture is taken out and the non-appropriate insertion of the card is not detected, the control section reads out the stored normal light emission combination of the emission color and the emitting method and performs the light emission control based on the stored normal combination of the emission color and the emitting method.

3. The card processing system according claim 2, wherein the card insertion detection mechanism comprises a thickness detection mechanism structured to detect a thickness of the card and a width detection mechanism structured to detect a width of the card in a direction perpendicular to an inserting direction of the card.

4. The card processing system according to claim 3, wherein
    the card is formed in a substantially rectangular shape, and
    the card reader performs at least one of reading of data and recording of data to the card which is inserted so that a short-side direction of the card is an inserting direction of the card.

5. The card processing system according to claim 3, wherein
    the card is formed in a substantially rectangular shape, and
    the card reader performs at least one of reading of data and recording of data to the card which is inserted so that a short-side direction of the card is an inserting direction of the card.

6. The card processing system according claim 1, wherein the card insertion detection mechanism comprises a thickness detection mechanism structured to detect a thickness of the card and a width detection mechanism structured to detect a width of the card in a direction perpendicular to an inserting direction of the card.

7. The card processing system according to claim 1, wherein
    the card is formed in a substantially rectangular shape, and
    the card reader performs at least one of reading of data and recording of data to the card which is inserted so that a short-side direction of the card is an inserting direction of the card.

8. The card processing system according to claim 7, wherein
    the control section stores a normal light emission combination of the emission color and the emitting method when the non-appropriate insertion of the card has been detected based on the detected result of the card insertion detection mechanism, and after that, the control section performs the light emission control based on the predetermined abnormality combination of the emission color and the emitting method, and when the non-normal card or the normal card inserted in a wrong posture is taken out and the non-appropriate insertion of the card is not detected, the control section reads out the stored normal light emission combination of the emission color and the emitting method and performs the light emission control based on the stored normal combination of the emission color and the emitting method.

* * * * *